United States Patent [19]

Grosz

[11] Patent Number: 5,299,856
[45] Date of Patent: Apr. 5, 1994

[54] DUMP VEHICLE WITH HYDRAULIC LOCK FOR MATERIAL HOLDING CONTAINER

[75] Inventor: William R. Grosz, Richardton, N. Dak.

[73] Assignee: Richardton Manufacturing Compan (Div. of Core), Richardton, N. Dak.

[21] Appl. No.: 702,602

[22] Filed: May 17, 1991

[51] Int. Cl.⁵ ............................................. B60D 1/34
[52] U.S. Cl. ................................. 298/11; 298/22 C; 298/17 S; 298/23 D
[58] Field of Search ................. 298/6, 11, 22 R, 22 C, 298/17 B, 23 D, 420, 421, 422; 70/DIG. 48

[56] References Cited

U.S. PATENT DOCUMENTS

| | | |
|---|---|---|
| 1,819,168 | 8/1931 | Heil et al. . |
| 2,234,599 | 3/1941 | Johnston . |
| 2,440,325 | 4/1948 | Bruno . |
| 2,750,055 | 6/1956 | Huffines . |
| 3,022,111 | 2/1962 | Hutchinson ..................... 298/22 R |
| 3,083,058 | 3/1963 | Walstrom et al. . |
| 3,450,436 | 6/1969 | Phillips . |
| 3,633,971 | 1/1972 | Berky et al. . |
| 3,685,674 | 8/1972 | Bruer et al. . |
| 3,830,543 | 8/1974 | Kostman . |
| 3,844,617 | 10/1974 | Kostman . |
| 3,937,502 | 2/1976 | Gay . |
| 4,003,601 | 1/1977 | Gerding . |
| 4,019,380 | 4/1977 | Raymond . |
| 4,029,359 | 7/1977 | Glomski . |
| 4,200,334 | 4/1980 | Lindholm . |
| 4,327,945 | 5/1982 | Fowler . |
| 4,352,626 | 10/1982 | Frisbee et al. . |
| 4,388,038 | 6/1983 | Freitag . |
| 4,392,687 | 7/1983 | O'Connell . |
| 4,430,038 | 2/1984 | Rempel et al. . |
| 4,573,742 | 4/1986 | Tegtmeier ........................... 298/11 |
| 4,898,427 | 2/1990 | Francis . |
| 4,930,297 | 6/1990 | Schlueter et al. . |
| 4,989,917 | 2/1991 | Schmidt, Jr. ....................... 298/11 |
| 5,064,248 | 11/1991 | Tegtmeier ........................... 298/11 |

FOREIGN PATENT DOCUMENTS

| | | |
|---|---|---|
| 2203951 | 8/1973 | Fed. Rep. of Germany .......... 298/6 |
| 2246868 | 4/1974 | Fed. Rep. of Germany ...... 414/421 |
| 511840 | 9/1976 | U.S.S.R. ............................. 298/11 |

OTHER PUBLICATIONS

Translation of p. 13 of DE-2203951, previously cited.

Primary Examiner—Michael S. Huppert
Assistant Examiner—Gregory A. Morse
Attorney, Agent, or Firm—Harness, Dickey & Pierce

[57] ABSTRACT

A dump vehicle, such as for agricultural use, includes a movable support member and a slide structure for supporting and guiding the support member, a container pivotally mounted to the support member, a hydraulic actuator mechanism actuable to lift the container from an original lowered position to a predetermined raised position and to tilt the container at the support member when in the predetermined raised position to a preselected tilted position to permit discharge of the contents of the container. The dump vehicle further includes a hydraulic lock mechanism actuable in response to tilting of the container towards the tilted position to lock the support member in the predetermined raised position to prevent over centering and downward movement of the container from the predetermined raised position during tilting and discharging of the container. The hydraulic lock mechanism is responsive to the container returning to its pretilted position while at the predetermined raised position to unlock the support member and to permit return of the container to its original lowered position.

14 Claims, 4 Drawing Sheets

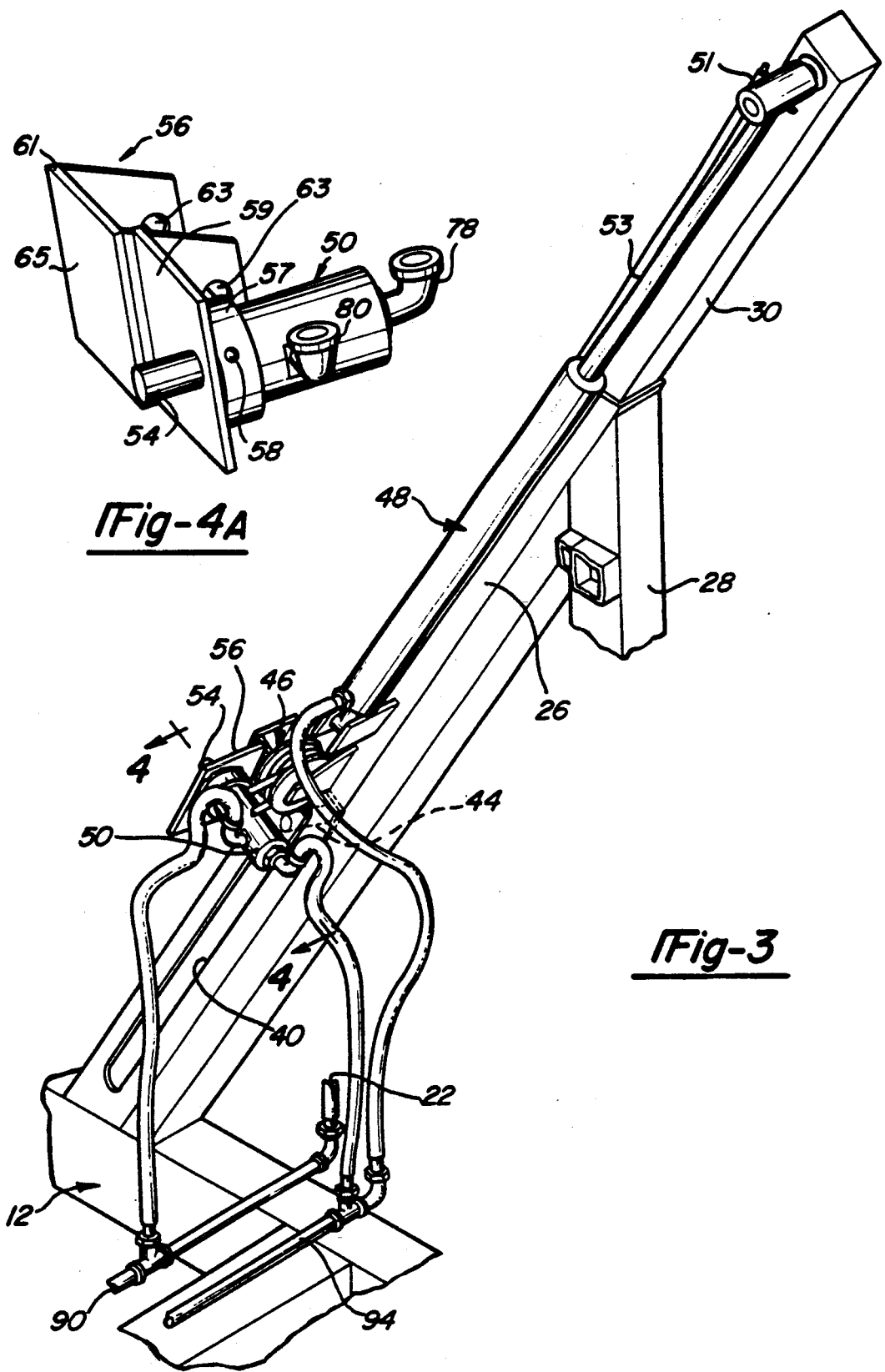

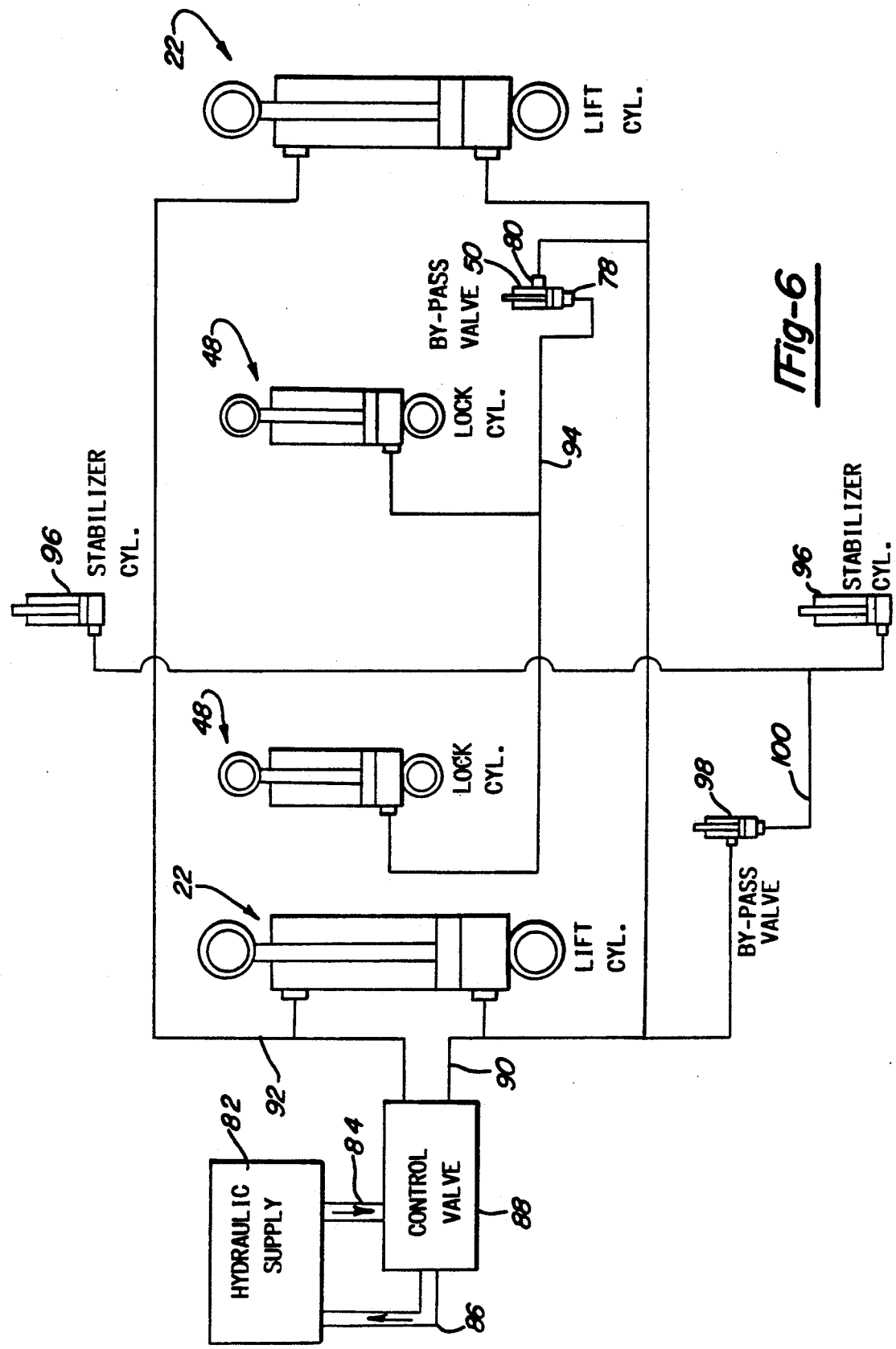

DUMP VEHICLE WITH HYDRAULIC LOCK FOR MATERIAL HOLDING CONTAINER

FIELD OF THE INVENTION

The present invention relates to dump vehicles, and more particularly to dump vehicles for agricultural and other uses having a material holding container and in which it is desirable to provide a relatively high tilt and dump position for the container.

SUMMARY BACKGROUND OF THE INVENTION

Dump vehicles or dump wagons of this type are widely used for agricultural purposes, wherein the vehicle often takes the form of a wagon adapted to be drawn behind a farm tractor. The wagon has a chassis with a frame and wheel structure. A relatively tall sided material holding or dump container is supported on the frame and has a pouring or dump side which is sloped to facilitate discharging of the material out when the container or box is elevated and tilted to the dump position. It is generally desirable that such wagons provide a dumping mechanism so that when the container is in its elevated and tilted position, the pouring edge along one side of the container will be located in a high position to facilitate dumping silage and the like into high sided trucks or storage bins. At the same time, it is desirable that, in the dump position, the pouring edge of the container be located somewhat laterally offset from the chassis to facilitate dumping into a truck or bin which is located alongside.

Prior dump wagons have used a hydraulic cylinder construction to first lift the container by means of an angulated support arm and slide structure to the desired elevated position; once at the end of the travel of the support arm and slide structure the continued action of the lift cylinder tilted the container to its dump position. Such a structure is generally shown in the U.S. Pat. No. 3,844,617 issued Oct. 29, 1974 to Kostman. After the conclusion of the dumping step the lift cylinder is retracted permitting the container to pivot back to its pretilt position and, upon further retraction of the lift cylinder, the container, via the support arm and slide structure, moves down to its original, lowered position.

Because of the size and weight of the container, especially when fully loaded, a lift cylinder and support arm and slide structure are located at each end of the wagon chassis. In order to assure that both ends of the container are raised and lowered uniformly and in unison, an equalizing cable and pulley structure has been used in certain dump wagons. The cable and pulley structure is connected between the support arms at both sides of the container and resists unequal movement of one side relative to the other. This is significant since any canting of the container between the support arm and slide structures could result in wedging and possible damage to these and related structures. During the tilting and dumping action high static and dynamic loads can be imparted to the apparatus which could cause one end of the container to prematurely move down its slide structure relative to the other end whereby wedging could occur. Thus it has been found desirable that each of the support arms be locked in place relative to its slide structure after the container has been elevated to its raised position but before significant tilting has occurred. As noted this is to prevent one side or the other of the container from inadvertently moving back down the slide structure resulting in the undesirable wedging noted.

But there is an additional reason for locking the support arms in position during the tilting and dumping operation. In order to assure that the contents of the container or box have been fully emptied, it is common for the operator to manipulate the hydraulic power to the lift cylinders to rapidly and repetitively pivot the container to and from the fully tilted position to cause the container to oscillate from its fully tilted position. In this way the remainder of the contents of the container can be shaken loose to more completely empty the container. It can be appreciated, however, that this action results in significant vibrational loads being applied to the dump wagon structure. Note that the maximum degree of tilting is controlled by the uppermost, locked position of the support arm and the uppermost position of the lift cylinder. The support arms are located at the pouring side of the container with the container pivotally secured to the upper ends of the arms; the lift cylinders are located adjacent to but offset from the support arms and are connected at the upper end of the container at locations behind the pouring side of the container. Thus the amount of pivoting is controlled by these two location points.

In the past a mechanical lock mechanism located at each end of the container has been used to mechanically lock the support arms in their uppermost locations. Thus the lock mechanism is automatically actuated after the container is in its raised position and begins to be tilted for dumping and is automatically deactuated when the container has been tilted back to its pretilt position. Because of the vibrational and other load factors noted, the mechanical latch at one or both of the support arms could, from time to time, be dislodged whereby one side or both of the container would begin to prematurely move down the slide structure.

At the same time, however, the lift cylinder would be near or at its fully raised position thus placing the container near or at its fully tilted position. However, if the mechanical lock became dislodged, the pouring side of the container could move or slide downwardly along the slide structure; this could result in excessive tilting or overcentering of the container whereby it could no longer be retracted by the lift cylinder. This action could damage the apparatus and/or render it inoperable until the necessary equipment could be secured to move the container back to a position where it can be untilted and lowered. As previously noted, it is also possible that the movement of one side of the container only towards the lowered portion could result in wedging and damage to the apparatus.

BRIEF SUMMARY OF THE INVENTION

In the present invention the preceding occurrences are prevented by the use of a second cylinder arrangement at each end of the container which provides the lock function. The second or lock cylinders are connected to support arms at the pouring side of the container proximate to the pivot connections. Thus as tilting of the container is initiated by the lift cylinders the lock cylinders are hydraulically locked via actuation of a by-pass valve to a closed or blocking position; this locks the support arms in their uppermost positions and thus prevents both sides of the container from prematurely moving downwardly and thus prevents overcentering and/or wedging. When the container has been pivoted back to its pretilt position, a plate integrally fixed to the container engages a plunger of the by-pass valve moving it to an open position thereby relieving the hydraulic lock holding the lock cylinders in the locked position. With the support arms thus unlocked, the container can now move down the slide structure to its original lowered position via the lift cylinders with the equalizing cable and pulley structure acting to assure uniform descent of both sides of the container.

Therefore it is an object of the present invention to provide a new and improved dump vehicle.

It is another object of the invention to provide a new and unique hydraulic lock structure for a dump wagon to prevent overcentering and/or wedging of the container while in its tilted, dump position.

Other objects, features, and advantages of the present invention will become apparent from the subsequent description and the appended claims, taken in conjunction with the accompanying drawings.

BRIEF DESCRIPTION OF THE DRAWINGS

FIG. 3 is an enlarged, fragmentary view taken generally in the direction of the arrows 3—3 in FIG. 2 depicting one of the lock cylinders including a by-pass valve which is normally held in an open condition with the apparatus oriented as shown in FIG. 2 but is operable to a closed position to place the lock cylinder in its locked condition;

FIG. 4A is an enlarged pictorial view of the by-pass valve and support bracket to which it is secured;

FIG. 6 is a schematic diagram generally depicting the hydraulic circuit for hydraulically lifting, tilting and locking the dump wagon of FIGS. 1-5.

DETAILED DESCRIPTION OF THE INVENTION

Figure 1:
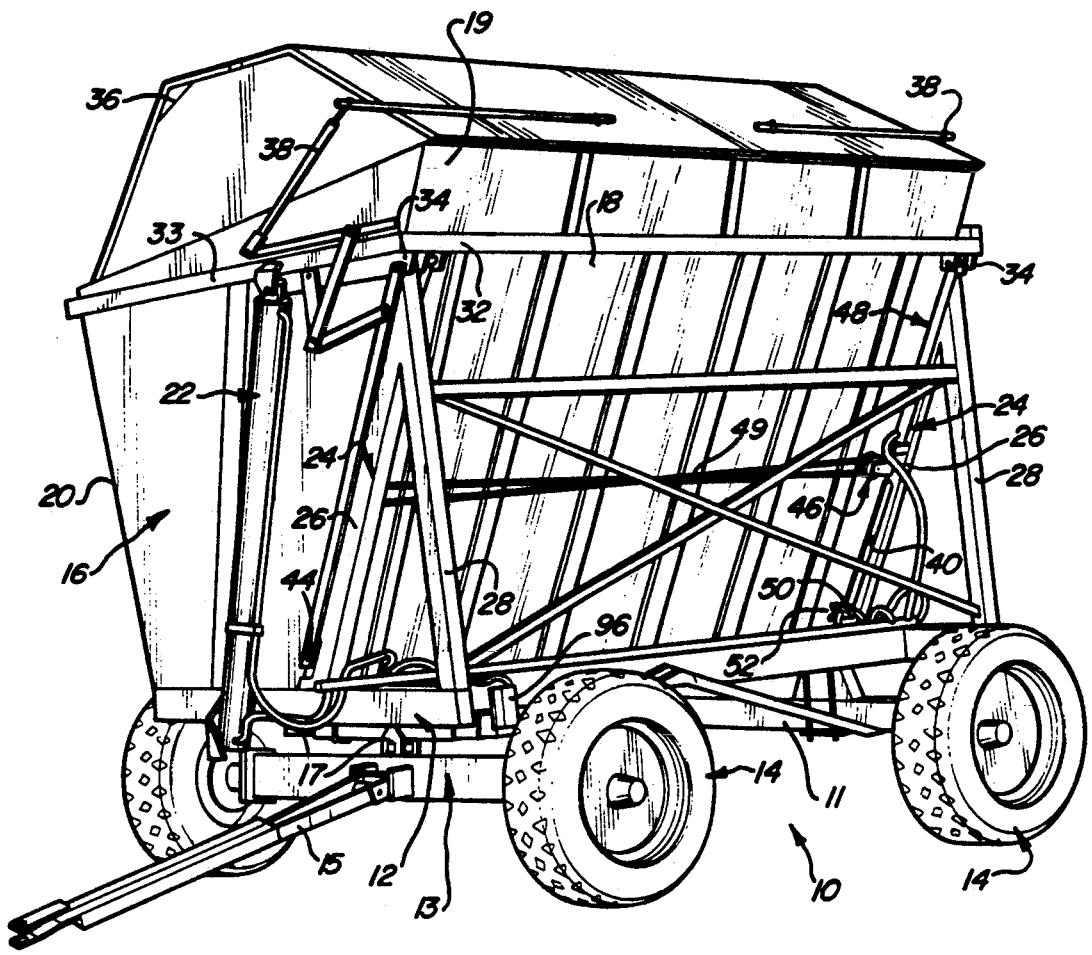
FIG. 1 is a pictorial view of a dump wagon embodying features of the present invention, including a dump container and lock cylinders for locking the dump container at a preselected raised position.

Looking now to the drawings, FIG. 1 shows a dump wagon 10 having a chassis with a frame 12 and a wheel and suspension structure 14. The wheel and suspension system includes a stationary solid rear axle 11 connected to the frame 12 and a steerable front axle 13 pivotally connected to the frame 12 via a pivot structure 17. A draw bar 15 is connected to the front axle 13 to facilitate connecting the wagon 10 to a tractor or other vehicle for towing. A relatively tall sided material container 16 is supported on the frame 12 and has sloping sides 18, 20; the angulation of sloping side 18 facilitates pouring the material out when the container 16 is elevated and tilted to its dump position. The sloped side 18 defines the pouring ordump side of the container 16 and has a pouring edge 19.

The dump wagon 10 has a pair of hydraulic lift cylinders 22 located at opposite ends of the container 16 and are pivotally connected between the frame 12 and container 16. A pair of angulated support arm and slide structures 24 are also located on the frame 12 at opposite sides of the container 16 and are connected to the container 16 in a manner to be more fully described. The lift-cylinders 22 are actuable by the vehicle operator to first lift the container 16 along the angulated support arm and slide structures 24 to the desired elevated position. As will be seen, at the end of the travel of the support arm and slide structures 24 the continued action of the lift cylinders 22 tilts the container 16 to its dump position. After completion of the dumping, the lift cylinders 22 are retracted permitting the container 16 to pivot back to its pretilt position and, upon further retraction of the lift cylinders 22, the container 16 moves via the support arm and slide structures 24 to its original, lowered position.

The structures noted thus far are well known in the art and hence specific details thereof have been omitted for purposes of simplicity. Thus the support arm and slide structures 24 include a generally "A" shaped portion made of generally rectangular sectioned hollow tube members 26, 28. The inner tube members 26 are adapted to serve as guides for support arms 30 which are slidably supported within these guide tube members 26. The container 16 is pivotally connected at each end to the support arms 30 at a vertical location 32 somewhat below the pouring edge 19 of container 16 via a known type of pivot structure 34.

The lift cylinders 22 are of the double acting type having a fixed cylinder and reciprocally movable piston and are connected at opposite ends of the container 16 at a location 33 which is offset from the pouring or dump side 18 of container 16. Thus each of the lift cylinders 22 will be hydraulically powered at its lower cylinder side during the lifting and tilting operation and at its upper cylinder side during the untilting and lowering operation.

The container 16 has a cover 36 connected at its upper open end via a linkage 38 by which the cover 36 is normally held closed during loading and which will automatically be extended to open the cover 36 when the container 16 is in its tilt or dump position.

Figure 2:
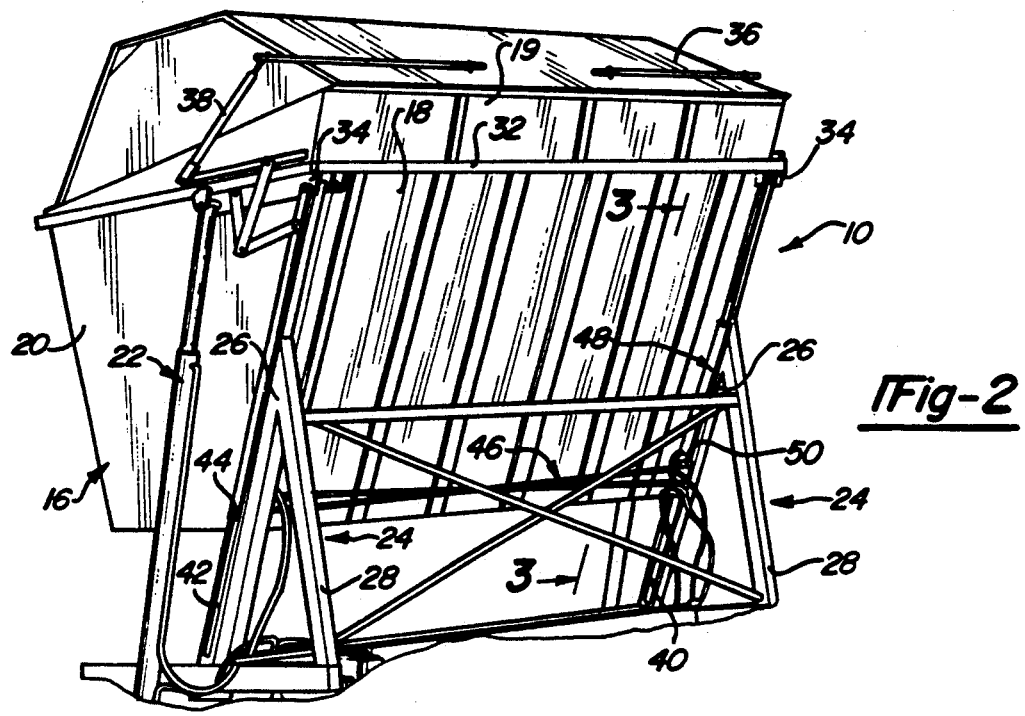
FIG. 2 is a fragmentary, pictorial view to reduced scale of the dump wagon of FIG. 1 depicting the dump container in its raised, pretilt condition.
Figure 5:
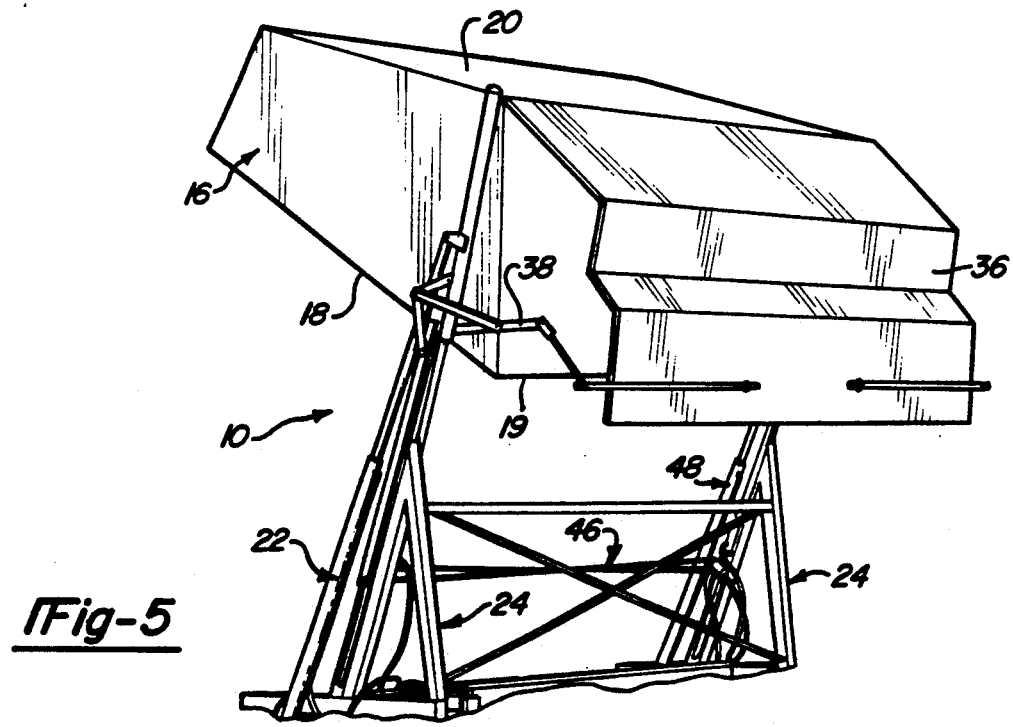
FIG. 5 is a fragmentary, pictorial view similar to FIG. 2 depicting the dump container in its fully tilted condition.

FIG. 2 shows the container 16 after it has been moved to its fully raised, pretilt condition by fluid actuation of each of the lift cylinders 22 at its lower cylinder side. Each of the support tube members 26 has a pair of vertically co-extending inner and outer slots 40, 42, respectively, at opposite sides. A cross pin 44 extends through each of the support arms 30 near its lower end and generally through each of the co-extending slots 40, 42. The pin 44 is adapted to move generally vertically within the slots 40, 42 and will engage these slots 40, 42 at their upper ends and thereby define the upper limit of travel of the support arm 30. This engagement acts as a stop to preclude further upward movement of the support arms 30 and hence of the pouring edge 19 of container 16 (see FIG. 2). Further actuation of the lift cylinder 22, however, now results in pivoting of the container 16 about the pivot structures 34 to pivot the container 16 to its full tilt or dump position. The full tilt position of the container 16 is achieved when the pistons of the lift cylinders 22 have bottomed out or reached the end of their upward travel. Upon completion of the dumping of the contents of the container 16 the pressure is reversed on the lift cylinders 22, i.e. to the upper cylinder side, whereby the container 16 is returned to its pretilt condition (see FIG. 2) and then lowered to its initial lowered position (FIG. 1). As noted, the upper stop position of the support arms 30 and the end of upward travel of the pistons of lift cylinders 22 will define the selected, maximum degree of tilting of the container 16 to facilitate dumping. Excess tilting beyond the selected maximum could result in overcentering, jamming and damage to the structure.

As previously discussed, with some constructions, in order to assure that both ends of the container 16 are raised and lowered uniformly and in unison, an equalizing cable and pulley structure 46 is utilized. The cable and pulley structure 46 is connected to both of the support arms 30 and resists unequal translational movement of one arm 30 relative to the other during raising and lowering via the lift cylinders 22 and hence inhibits canting of the container 16 which could result in wedging of the support arms 30 in the guide tube members 26 and possible damage to these and related structures. The equalizing structure 46 is of a type well known in the art and hence is only generally shown.

It has been common with prior structures to provide a mechanical lock mechanism located at each end of the container to lock the support arms (such as 30) in their fully raised position. The latter mechanism is automatically actuated when the container begins to be tilted for dumping and is automatically deactuated when the container has been tilted back to its pretilt position. From time to time, such mechanical lock mechanism could be dislodged from one or both support arms as a result of vibrational or other load factors whereby one side or both of the container would begin to prematurely move down the slide structure.

If the latch becomes dislodged, the front of the container (such as pouring edge 19 of container 16) can move or slide downwardly via the support arm and slide structures (such as 24); this could result in excessive tilting or overcentering of the container (such as 16) whereby it could no longer be retracted by the lift cylinders (such as 22). This action could damage the apparatus and/or render it inoperable until the necessary equipment could be secured to move the container (such as 16) back to a position where it can be untilted and lowered. Such inadvertent unlocking is prevented in the present invention by the use of a pair of lock cylinders 48 located with the support arm and slide structures 24 at each end of the container 16. The lock cylinders 48 are of a single action construction having a fixed cylinder and reciprocably movable piston and are connected between the guide tube members 26 and the support arms 30. As tilting of the container 16 is initiated by the lift cylinders 22 the lock cylinders 48 are hydraulically locked via actuation of a by-pass valve 50 to a blocking position. As noted the tilting occurs only after the support arms 30 have been moved to their uppermost positions as defined by engagement of pins 44 with the upper ends of slots 40,42. With the lock cylinders 48 hydraulically locked, this locks the support arms 30 in their uppermost positions and thus prevents both sides of the container 16 from prematurely moving downwardly and thus prevents overcentering and/or wedging of container 16. When the container 16 has been pivoted back to its pretilt position, a plate 52, which is integrally fixed on the pouring side 18 of the container 16, is located to engage a plunger 54 of the by-pass valve 50 moving it to an open position thereby relieving the hydraulic lock holding the lock cylinders 48 in the locked position. With the support arms 30 thus unlocked, the container 16 can now move down the guide tube members 26 via the support arms 30 to be returned to its original, lowered position via the lift cylinders 22 with the equalizing structure 46 acting to assure uniform descent of both sides of the container 16. In this regard it should be noted that cable 49 of equalizing structure 46 is connected at its opposite ends to pins 51 which also connect each of the piston rods 53 of lock cylinders 48 to the respective support arm 30.

Figure 4:
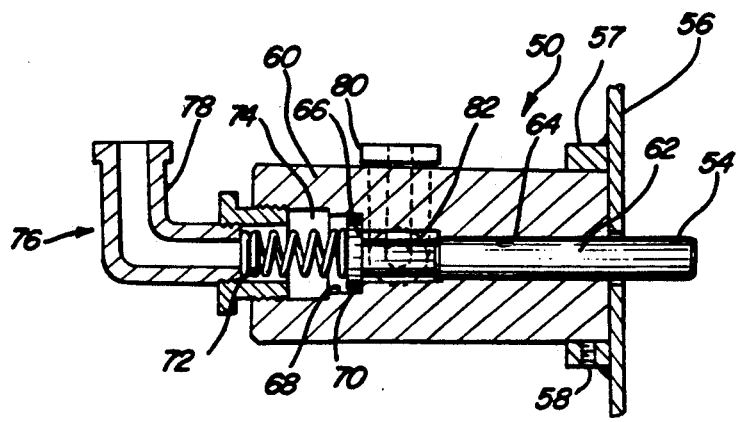
FIG. 4 is an enlarged sectional view of the by-pass valve of FIG. 2 taken generally along the lines 4—4 in FIG. 3 and depicting the by-pass valve in its closed or blocking condition.

Looking now to FIGS. 3, 4 and 4A, the by-pass valve 50 is connected to a support bracket 56 via a retaining ring 57 via a plurality of set screws 58. The retaining ring 57 is welded or otherwise fixed to support plate 59 which in turn is fixed to a U shaped bracket portion 61. The U-shaped bracket 61 has a pair of in line openings 63 which are adapted to receive the stop pin 44. The bracket 61 is located behind the associated support tube 26 with the stop pin 44 secured to the support arm 30 while extending through slots 40, 42. Thus the bracket 56, stop pin 44 and by-pass valve 50 will be moved with the support arm 30. Note that only one bypass valve 50 is utilized and hence the bracket such as 56 on the support arm 30 at the other end does not have the support plate 59. The pouring side 18 of container 16 normally rests against the surface 65 of U-shaped bracket 61 in its untilted piston. The support plate 59 is offset from the rest surface 65 such as to locate the plunger 54 in a selected position for actuating engagement with plate 52. Thus the by-pass valve 50 moves vertically in translation with the container 16 via the support arms 30. While the support arm 30 is in the lowered position (FIG. 1) and during movement to its fully raised position (FIG. 2), the by-pass valve 50 is held in its open position via engagement of the plate 52 with the plunger 54 Upon the initiation of tilting of the container 16 and disengagement of the plate 52 from plunger 54, the by-pass valve 50 will move to its closed position. This can be seen from FIG. 4. Thus the valve 50 includes a housing 60 having a central, through bore 62. The bore 62 has a reduced diameter portion 64 which slidingly supports the plunger 54. Plunger 54 is integral with an enlarged valve head 66 located at the inner end of plunger 54. The valve head 66 is located in an enlarged bore portion 68 and is normally urged into engagement with a valve seat 70 by a return spring 72. The enlarged bore portion 68 terminates in a counterbore 74 in which an elbow 76 is located via a reducer bushing 78. The spring 72 is in compression between the valve head 66 and the inner face of elbow 76. Another elbow 80 is in communication with an intermediate bore portion 82 of through bore 62. As will be seen the elbow 80 is connected to a source of hydraulic fluid for both pressure and return while the elbow 76 is connected to both lock cylinders 48. When plunger 54 is engaged by the plate 52 the valve head 66 will be unseated from the valve seat 70 opening fluid communication from the elbow 76 through counterbore 74, enlarged bore portion 68 and intermediate bore portion 82. In the beginning of the dump operation, when the container 16 is initially tilted away from rest surface 65, the integral plate 52 is also moved away from plunger 54; the valve head 66 then will be seated against the valve seat 70 via the spring 72 thereby closing the communication between the source of fluid pressure through the elbow 80 to elbow 76. Thus the by-pass valve 50 is operative to block the release of fluid pressure, from the lock cylinders 48 during the tilting of container 16 to thereby lock the support arms 30 in their uppermost raised position.

The hydraulic system is generally shown in FIG. 6. Thus the hydraulic system includes a source of hydraulic pressure 82 having a high pressure outlet line 84 and a return line 86. Both lines 84 and 86 are connected to a control valve 88 which is selectively operable by the vehicle operator. Control valve 88 has two lines 90, 92 both of which can be alternately connected to the high pressure output line 84 and return line 86 of the hydraulic pressure source 82 via the control valve 88. The line 90 is connected directly to the lower cylinder side or piston head end of the lift cylinders 22 and is connected to the piston head end of both of the lock cylinders 48 through the by-pass valve 50. As noted only one by-pass valve 50 is utilized to control both lock cylinders 48. In this regard, the line 90 is connected to the elbow 80 while the elbow 76 is connected to the lock cylinders 48 via fluid line 94. At the same time the other line 92 from control valve 88 is connected to the rod end of the lift cylinders 22. In operation, the operator can move the control valve 88 to its lift and dump condition in which the line 90 is connected to the high pressure line 84 from hydraulic pressure source 82 and the line 92 is connected to the return line 86 to hydraulic pressure source 82. In this condition the double acting lift cylinders 22 ar actuated to lift the container 16. At the same time the lock cylinders 48 are pressurized via the by-pass valve 50 in the open position. When the stop pins 44 have engaged the upper ends of slots 40, 42 the upward movement of the support arms 30 and of the pouring or dump side 18 of the container 16 is stopped. The pistons of the lift cylinders 22, however, can still continue their upward travel. Thus with continued pressurization, the lift cylinders 22 cause the container 16 to begin to tilt about pivot structures 34. This moves the plate 52 away from plunger 54 whereby the by-pass valve 50 is actuated to its closed or blocked condition. This locks in the pressure at the lock cylinders 48. Upon completion of dumping the vehicle operator now places the control valve 88 into its return condition. In this condition, the line 90 is connected to the return line 86 while the other line 92 is connected to high pressure line 84. Thus the pressure on the lift cylinders 22 is reversed pulling the container 16 back towards its pretilt position. But the by-pass valve 50 remains closed until the container 16 has substantially completely returned to its pretilt condition thus locking in the fluid pressure to lock cylinders 48 to thereby prevent inadvertent downward movement of the pouring or dump side 18 of the container during the tilting, dumping and untilting of container 16. With the container 16 returned to its pretilt position, the continued actuation of the rod end of lift cylinders 22 will result in the container 16 being returned to its original lowered position.

Thus it can be seen that even if the operator chose to oscillate the container 16 when at its fully tilted position to provide more complete dumping of the contents, the lock cylinders 48 would remain pressurized and locked and hence prevent any downward movement of the pouring or dump side 18 of container 16 down the guide tube members 26. Thus the present invention provides a more reliable structure for locking the container 16 in its upper position with the attendant advantages noted.

As noted the front axle 13 is pivotally mounted to the frame 12 via pivot structure 17. In order to prevent pivoting of the container 16 and frame 12 about the pivot structure 17 during the lifting and poring or dumping operation, a pair of stabilizer cylinders 96 are located at each side of the front axle 13 between the frame 12 and axle 13. The cylinders 96 are normally not in engagement between the frame 12 and axle 13. However, upon actuation of the control valve 88 to raise the container 16 the stabilizing cylinders 96, which are of the single action type, are energized via pressure from output line 90 through a by-pass valve 98, which is normally held open, and fluid line 100 which is connected to the piston ends of each stabilizer cylinder 96. Once actuated the stabilizing cylinders 96 hold the frame 12 from pivoting relative to the front axle 13. As the container 16 is raised the by-pass valve 98 is actuated to its normally closed position to lock the fluid pressure in and to maintain the frame 12 and front axle 13 locked from pivoting. Upon lowering of container 16 to its original lowered position, the by-pass valve 98 will be actuated by the container 16 to its open position whereby the fluid pressure in the stabilizing cylinders 96 is released thereby removing the locking action between the frame 12 and front axle 13 so that the pivoting action can again occur. Note that the by-pass valve 98 is similar in construction and operation to the by-pass valve 50 and hence the details thereof have not been repeated.

While it will be apparent that the preferred embodiments of the invention disclosed are well calculated to fulfill the objects stated above, it will be appreciated that the invention is susceptible to modification, variation and change without departing from the proper scope or fair meaning of the invention.

What is claimed is:

1. A dump vehicle comprising:
   a frame structure,
   a wheel structure connected to said frame structure whereby said dump vehicle can be moved,
   a plurality of spaced apart upwardly and outwardly sloping support arm and slide structures operatively supported by said frame structure,
   said support arm and slide structures comprising a movable support arm having an upper end and a slide structure,
   said slide structure being inclined outwardly at a preselected angle of inclination relative to said frame structure and being generally secured from pivotal movement relative to said frame, said slide structure slidably supporting and guiding said support arm for sliding movement in translation along said angle of inclination,
   a container pivotally mounted along an upper portion to said upper ends of said support arms,
   a plurality of hydraulic actuators operatively connected between said container and said frame structure in spaced relationship to said support arm and slide structures, said hydraulic actuators actuable to lift said container in translation on said slide structure along said angle of inclination from an original lowered position to a predetermined raised position and subsequently to tilt said container at said support arms when in said predetermined raised position to a preselected tilted position to permit discharging of the contents of said container,
   hydraulic lock means comprising a plurality of lock piston and cylinder assemblies with each being operatively connected with a different one of said support arms,
   said lock piston and cylinder assemblies being operative in response to hydraulic pressure during lifting of said container to said predetermined raised position whereby each of said lock pistons is moved upwardly along with the associated one of said support arms and in load bearing relationship with said one of said support arms and said container, said hydraulic lock means actuable in response to tilting of said container towards said tilted position by said hydraulic actuators to lock hydraulic fluid under pressure in said lock cylinders whereby said lock pistons and the associated ones of said support arms are locked in said predetermined raised position to preclude downward sliding translational movement of said container from said predetermined raised position during tilting and discharging of said container, said hydraulic lock means being responsive to said container returning to its pretilted position while at said predetermined raised position to release the fluid pressure in said lock cylinders and to unlock said lock pistons and said support arms to permit return of said container to said original lowered position.

2. The dump vehicle of claim 1 comprising first stop means associated with said support arm and slide structures for limiting the upward movement of said support arms to define said predetermined raised position, and second stop means limiting the upward actuating movement of said container by said hydraulic actuators to define with said first stop means a predetermined maximum tilt of said tilted position of said container about said support arms.

3. The dump vehicle of claim 1 with said hydraulic lock means further comprising a valve member operatively connected to said lock cylinders for locking and releasing hydraulic fluid under pressure from said lock cylinders and for placing said lock cylinders in their locked and unlocked conditions.

4. A dump vehicle comprising:
support means comprising a movable support member and a fixed guide structure for supporting and guiding said support member for translational movement along a preselected angle of inclination,
a container pivotally mounted to a pivot structure on said support member,
actuator means operatively connected with said container and being actuable to lift said container and said support member in translation along said preselected angle of inclination from an original lowered position to a substantially final predetermined raised position and subsequently to tilt said container at said pivot structure on said support member when in said predetermined raised position to a preselected tilted position to permit discharge of the contents of said container,
said support means operatively connected with said container for guiding said container in the translational movement along said preselected angle of inclination as it is raised by said actuator means from said original lowered position to said predetermined raised position, lock means comprising a lock piston and cylinder assembly being operatively connected with said support means and said container,
said lock piston and cylinder assembly being operative in response to fluid pressure during lifting of said container to said predetermined raised position whereby said lock piston is moved upwardly along with said support member and in load bearing relationship with said support member and said container,
said lock means actuable in response to tilting of said container towards said tilted position by said actuator means to lock fluid under pressure in said lock cylinder whereby said lock piston and said support member are locked from downward movement whereby said container is locked in said predetermined final raised position to preclude downward sliding translational movement of said container from said predetermined raised position during tilting and discharging of said container and being responsive to said container returning to its pretilted position while at said predetermined raised position to release the fluid pressure in said lock cylinder to unlock said lock piston and said support member to permit return of said container to said original lowered position.

5. The dump vehicle of claim 4 comprising first stop means associated with said support means for limiting the upward generally translational sliding movement of said support member to define said predetermined raised position, and second stop means limiting the upward actuating movement of said container by said actuator means to define with said first stop means a predetermined maximum tilt of said tilted position of said container about said support member.

6. The dump vehicle of claim 4 with said lock means further comprising a valve member connected to said lock cylinder for locking and releasing fluid under pressure from said lock cylinder and for placing said lock cylinder in its locked and unlocked condition.

7. A dump vehicle comprising:
a frame structure,
an upwardly and outwardly sloping support arm and slide structure supported by said frame structure,
said support arm and slide structure comprising a movable support arm and a slide structure, said slide structure being inclined outwardly at a preselected angle of inclination relative to said frame structure and being generally secured from pivotal movement relative to said frame, said slide structure slidably supporting and guiding said support arm for sliding movement in translation along said angle of inclination,
a container pivotally mounted to said support arm,
a hydraulic actuator operatively connected with said container, said hydraulic actuator actuable to lift said container in translation along said angle of inclination of said slide structure from an original lowered position to a substantially final predetermined raised position and subsequently to tilt said container on said support arm when in said predetermined raised position to a preselected tilted position to permit discharge of the contents of said container,
hydraulic lock means comprising a lock piston and cylinder assembly being operatively connected with said support arm and slide structure,
said lock piston and cylinder assembly being operative in response to hydraulic pressure during lifting of said container to said predetermined raised position whereby said lock piston is moved upwardly along with said support arm and in load bearing relationship with said support arm and said container,
said hydraulic lock means actuable in response to tilting of said container towards said tilted position by said hydraulic actuator to lock fluid under pressure in said lock cylinder whereby said lock piston and said support arm are locked in said predetermined raised position to preclude downward movement of said container from said predetermined raised position during tilting and discharging of said container and being responsive to said container returning to its pretilted position while at said predetermined raised position to release the fluid pressure in said lock cylinder to unlock said lock piston and said support arm and to permit return of said container to said original lowered position.

8. The dump vehicle of claim 7 comprising first stop means associated with said support arm and slide structure for limiting the upward movement of said support arm to define said predetermined raised position, and second stop means limiting the upward actuating movement of said container by said hydraulic actuator to define a predetermined maximum tilt of said tilted position of said container about said support arm.

9. The dump vehicle of claim 7 with said hydraulic lock means further comprising a valve member connected to said lock cylinder for locking and releasing hydraulic fluid under pressure from said lock cylinder and for placing said lock cylinder in its locked and unlocked conditions.

10. A dump vehicle comprising:
a frame structure,
a pair of spaced apart upwardly and outwardly sloping support arm and slide structures operatively supported by said frame structure,
each of said support arm and slide structures comprising a movable support arm and a slide structure, said slide structure being inclined outwardly at a preselected angle of inclination relative to said frame structure and being generally secured from pivotal movement relative to said frame, said slide structure slidably supporting and guiding said support arm for sliding movement in translation along said angle of inclination,
a container pivotally mounted to said support arms,
a pair of hydraulic lift cylinders operatively connected between said container and said frame structure in spaced relationship to said support arm and slide structure, said hydraulic lift cylinders actuable to lift said container in translation along said slide structure and along said angle of inclination from an original lowered position to a predetermined raised position and subsequently to tilt said container at said support arms when in said predetermined raised position to a preselected tilted position to permit discharging of the contents of said container,
a pair of hydraulic lock cylinders and associated lock pistons each operatively associated with one of said support arm and slide structures, each of said lock cylinders and lock pistons having a locked condition locking said lock pistons from movement in said lock cylinders and an unlocked condition permitting movement of said lock pistons in said lock cylinders, means connecting said lock pistons in load bearing relationship with said support arms and said container whereby said lock pistons will hold said container from translational movement towards said original lowered position during said unlocked condition, condition and will permit translational movement towards said original lowered position during said unlocked condition, sensing means responsive to tilting of said container by said lift cylinders towards said tilted position to lock fluid pressure in said lock cylinders to lock said lock pistons whereby said support arms and said container are locked in said predetermined raised position to preclude downward translational movement of said container from said predetermined raised position during tilting and discharging of said container, said sensing means being responsive to said container returning to its pretilted position while at said predetermined raised position to actuate said lock cylinders and associated lock pistons to unlock said support arms and said container and to permit return of said container to said original lowered position, hydraulic supply means connected to both said lift cylinders and said lock cylinders for providing hydraulic fluid under pressure to said lift cylinders and said lock cylinders, said sensing means comprising valve means operatively connected between said hydraulic supply means and said lock cylinders and actuable for blocking fluid communication between said hydraulic supply means and said lock cylinders when in said locked condition to lock fluid pressure in said lock cylinders and permitting fluid communication between hydraulic supply means and said lock cylinders when in said unlocked condition to release fluid pressure from said lock cylinders, said hydraulic supply means continuing in fluid communication with said lift cylinders during said locked condition of said lock cylinders.

11. The dump vehicle of claim 10 with said valve means comprising a by-pass valve.

12. The dump vehicle of claim 10 with said valve means comprising a by-pass valve and with said lift cylinders being of a double action construction and having a first side responsive to fluid pressure from said hydraulic supply means to lift said container to said predetermined raised position and to tilt said container to said tilted position and a second side responsive to fluid pressure from said hydraulic supply means to untilt and return said container to said original lowered position, said lock cylinders having one side responsive to fluid pressure to hold said container in said predetermined position, and fluid circuit means connecting said first side of said lift cylinders to said one side of said lock cylinders through said by-pass valve and connecting said first side and said one side to said hydraulic supply means.

13. The dump vehicle of claim 10 comprising first stop means associated with said support arm and slide structures for limiting the upward movement of said support arms to define said predetermined raised position, and second stop means limiting the upward actuating movement of said container by said lift cylinders to define a predetermined maximum tilt of said tilted position of said container about said support arms.

14. The dump vehicle of claim 13 with said valve means comprising a bypass valve and with said lift cylinders being of a double action construction and having a first side responsive to fluid pressure from said hydraulic supply means to lift said container to said predetermined raised position and to tilt said container to said tilted position and a second side responsive to fluid pressure from said hydraulic supply means to untilt and return said container to said original lowered position, said lock cylinders having one side responsive to fluid pressure to hold said container in said predetermined position, and fluid circuit means connecting said first side of said lift cylinders to said one side of said lock cylinders through said by-pass valve and connecting said first side and said one side to said hydraulic supply means.

* * * * *

UNITED STATES PATENT AND TRADEMARK OFFICE
CERTIFICATE OF CORRECTION

PATENT NO. : 5,299,856
DATED : April 5, 1994
INVENTOR(S) : William R. Grosz

It is certified that error appears in the above-indentified patent and that said Letters Patent is hereby corrected as shown below:

Col. 5, line 51, delete "Via" and substitute therefor --via--.
Col. 7, line 23, delete "ar" and substitute therefor --are--.
Col. 7, line 64, delete "poring" and substitute therefor --pouring--.
Col. 12, line 21, Claim 10, after "between" insert --said--.

Signed and Sealed this

Sixteenth Day of August, 1994

Attest:

BRUCE LEHMAN

Attesting Officer

Commissioner of Patents and Trademarks